(12) United States Patent
Dreher et al.

(10) Patent No.: US 12,179,163 B2
(45) Date of Patent: Dec. 31, 2024

(54) SAFETY DEVICE FOR A SINGLE-USE MIXING OR STORAGE SYSTEM

(71) Applicant: SARTORIUS STEDIM BIOTECH GMBH, Goettingen (DE)

(72) Inventors: Thomas Dreher, Goettingen (DE); Alexandre Espachs Barroso, Goettingen (DE); Michael Gohs, Goettingen (DE); Alexander Halt, Guxhagen (DE); Bjoern Nickel, Guxhagen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 65 days.

(21) Appl. No.: 18/174,988

(22) Filed: Feb. 27, 2023

(65) Prior Publication Data
US 2023/0201781 A1 Jun. 29, 2023

Related U.S. Application Data

(63) Continuation of application No. PCT/EP2021/072459, filed on Aug. 12, 2021.

(30) Foreign Application Priority Data

Aug. 28, 2020 (EP) .................................... 20193459

(51) Int. Cl.
*B01F 35/21* (2022.01)
*B01F 35/22* (2022.01)
(Continued)

(52) U.S. Cl.
CPC ...... *B01F 35/2113* (2022.01); *B01F 35/2202* (2022.01); *B01F 35/2211* (2022.01);
(Continued)

(58) Field of Classification Search
CPC .............. B01F 2101/22; B67D 1/1238; B67D 1/1243; F17C 5/00; F17C 2250/043; F17C 2250/0636
(Continued)

(56) References Cited

U.S. PATENT DOCUMENTS 3,589,412 A * 6/1971 Levenson ................. G03D 3/16
141/95
5,965,447 A * 10/1999 Sekiyama ............. G01F 23/292
422/106
(Continued)

FOREIGN PATENT DOCUMENTS

EP 1441586 A1 8/2004
JP 2004181022 A 7/2004
(Continued)

OTHER PUBLICATIONS

International Search Report, PCT/EP2021/072459, Nov. 23, 2021, 2 pages.
Korean Office Action with English translation, Application No. 10-2023-7001340, Sep. 4, 2024, 13 pages.

*Primary Examiner* — Timothy L Maust
(74) *Attorney, Agent, or Firm* — Edell, Shapiro & Finnan, LLC

(57) ABSTRACT

A safety device for a single-use mixing or storage system (10), especially for use in a biopharmaceutical process, includes a flexible bag (12) made from a film material and a support structure (14) receiving and supporting the bag (12) in several directions. The support structure (14) allows an expansion of the bag (12) in an expansion direction. The safety device further includes a detection unit (20) adapted to detect an expansion of the bag (12) in the expansion direction, and a control unit (28) connected to the detection unit (20) and adapted to initiate a safety measure in response (Continued)

to the expansion of the bag (12) in the expansion direction that exceeds a given threshold.

11 Claims, 2 Drawing Sheets

(51) Int. Cl.
*B01F 35/221* (2022.01)
*B01F 101/22* (2022.01)
*F17C 5/00* (2006.01)

(52) U.S. Cl.
CPC ............. *B01F 2101/22* (2022.01); *F17C 5/00* (2013.01); *F17C 2203/0685* (2013.01); *F17C 2250/043* (2013.01); *F17C 2250/0636* (2013.01)

(58) Field of Classification Search
USPC .................................................... 141/114, 95
See application file for complete search history.

(56) References Cited

U.S. PATENT DOCUMENTS

| | | | |
|---|---|---|---|
| 6,450,215 B1 * | 9/2002 | Willemstyn | B65B 3/12 |
| | | | 141/237 |
| 9,586,728 B2 * | 3/2017 | Kling | A47K 5/1215 |
| 10,031,033 B2 | 7/2018 | Cutting | |
| 2003/0062094 A1 * | 4/2003 | Chiang | B01D 61/10 |
| | | | 141/114 |
| 2010/0012220 A1 * | 1/2010 | Waldron | B65B 39/08 |
| | | | 141/10 |
| 2016/0047764 A1 | 2/2016 | Cutting | |

FOREIGN PATENT DOCUMENTS

| | | |
|---|---|---|
| JP | 2015189482 A | 11/2015 |
| JP | 2016150756 A | 8/2016 |
| WO | 03037083 A1 | 5/2003 |

* cited by examiner

SAFETY DEVICE FOR A SINGLE-USE MIXING OR STORAGE SYSTEM

CROSS REFERENCE TO RELATED APPLICATIONS

This is a Continuation of International Application PCT/EP2021/072459 which has an international filing date of Aug. 12, 2021, and the disclosure of which is incorporated in its entirety into the present Continuation by reference. This Continuation also claims foreign priority under 35 U.S.C. § 119(a)-(d) to and also incorporates by reference, in its entirety, European Patent Application 20193459.3 filed on Aug. 28, 2020.

FIELD OF THE INVENTION

The invention relates to a safety device for a single-use mixing or storage system, especially for use in a biopharmaceutical process.

BACKGROUND

Single-use (disposable) mixing and storage systems are of great importance in the biopharmaceutical industry. Key applications are the preparation of buffer solutions, media and chemical reactions. Further, the storage of the final product or the storage of process-relevant substances which have to be transferred are common applications.

Mostly, single-use mixing and storage systems include flexible bags made of thin film material. These bags are usually accommodated in fixed containers made of stainless steel or hard plastic for support and mechanical stability. A disadvantage of flexible film materials is their sensitivity to pressure. If a bag is filled too quickly, overfilled or a filter used for venting is blocked, the pressure inside the bag can rise critically. Increased pressure can lead to leakage, resulting in contamination of the content, or bursting of the bag. This can entail a high financial loss, especially when a final product of a biopharmaceutical process, e.g. purified antibodies, is stored in the bag. Moreover, if a toxic medium is processed, operating personnel is at risk if the bag is damaged.

SUMMARY

It is therefore an object of the invention to increase the safety of a single-use mixing or storage system, especially when it is used in a biopharmaceutical process.

The above problem is solved by a safety device according to the independent claim(s). Advantageous and expedient embodiments of the invention are apparent from the dependent claims.

The invention provides a safety device for a single-use mixing or storage system, especially for use in a biopharmaceutical process. The safety device according to one formulation of the invention comprises a flexible bag made from a film material and a support structure receiving and supporting the bag in several directions. The support structure allows an expansion of the bag in a (main) expansion direction. The safety device further comprises a detection unit adapted to detect an expansion of the bag in the expansion direction, and a control unit connected to the detection unit and adapted to initiate a safety measure in case the expansion of the bag in the expansion direction exceeds a given (predetermined) threshold.

The invention is associated with the finding that single-use bags used in biopharmaceutical applications are usually installed in rigid support structures that surround the bag at the bottom and at the sides, but not at the top, i.e. the support structures are not closed by a top cover. During normal operation the bag lies flat on the surrounding walls of the support structure. In case of an overpressure the bag can only expand upwards. This expansion in a defined direction can be detected and used to initiate a safety measure, such as triggering an alarm and/or interrupting the filling of the bag. Thus, by providing the safety device, the bag can be protected from damage caused by overpressure.

Compared to a conventional single-use pressure sensor which could be installed in the single-use bag for the same purpose, the safety device according to the invention provides several advantages. The safety device can be used several times and is therefore more cost efficient in the long term. Furthermore, the safety device has a lower probability of failure and can be designed with a very high sensitivity. For example, pressure increases of less than 10 millibar can be detected.

The safety device according to the invention can also be used for monitoring the freezing of a single-use bag filled with a liquid medium. When the medium freezes, its volume may expand by 10 to 15%. Since the bag is supported in several directions, expansion is mainly or only allowed in the above-mentioned expansion direction (usually upwards) and can be detected by the detection unit. Vice versa, the safety device can also be used to monitor the thawing of a frozen single-use bag filled with a medium. In this case, the expansion is negative and the expansion direction is opposite to the expansion direction of a corresponding freezing process.

In a preferred embodiment of the invention, the detection unit includes a sensor element being in contact or coming into contact with the bag when the bag expands so that the sensor element is displaced or rotated by the expansion of the bag in the expansion direction. Thus, the expansion of the bag is transformed into a displacement or a pivoting movement of the sensor element, which can be a lever, for example.

According to a first aspect of detection, the movement of the sensor element is monitored in a contactless manner. In this case the detection unit further includes a trigger element emitting a trigger signal to the control unit in case the expansion of the bag in the expansion direction exceeds the threshold.

Preferably, the contactless trigger element includes a photoelectric sensor. The photoelectric sensor can be placed in relation to the movable sensor element such that the sensor element interrupts the light beam of the photoelectric sensor when a given threshold pressure is reached. There are photoelectric sensors available for determining the position of a sensor element that meet a certain performance level, especially a so-called safety integrity level (SIL). This ensures that the safety measure is really initiated independently of a process software controlling the filling of the bag with a filling component (e.g. a pump).

According to a second aspect of detection, the detection unit includes a trigger element physically performing a switching operation in case the expansion of the bag in the expansion direction exceeds the threshold. This corresponds to a mechanical detection of the bag expansion.

Preferably, the mechanical trigger element includes a contact switch, i.e. a switch performing a switching operation when it is contacted by another element (here: the sensor element). This solution is easy to install at low cost.

Irrespective of the type of detection (mechanical or contactless), especially a pivotable lever can be used as the sensor element. The pivotable lever is preferably mounted to the support structure by a mechanical bearing like a hinge.

A pivotable lever is also suitable for a further alternative which embodies an angle sensor as the trigger element.

As already indicated, the safety device according to the invention is especially useful in connection with a filling component (e.g. a pump or a component causing a pressure difference) which controls a fluid transfer into the bag. The control unit of the safety device is preferably connected to the filling component so that in case of a detected overpressure in the bag the operation of the filling component can be immediately ceased.

As an alternative or in addition, the control unit can be connected to an alarm system to trigger an audible and/or visual alarm.

BRIEF DESCRIPTION OF THE DRAWINGS

Further features and advantages of the invention will become apparent from the following description and from the accompanying drawings to which reference is made. In the drawings.

DETAILED DESCRIPTION

Figure 1B:
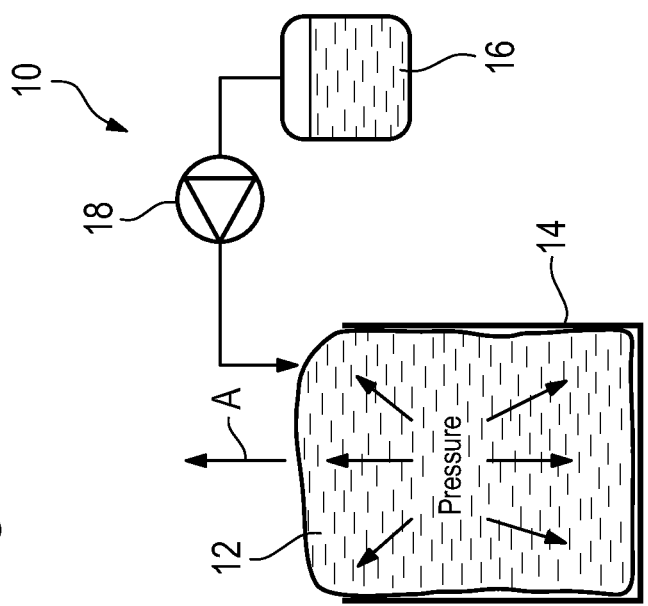
FIG. 1B shows the mixing or storage system of FIG. 1A in case of an overpressure.
Figure 1A:
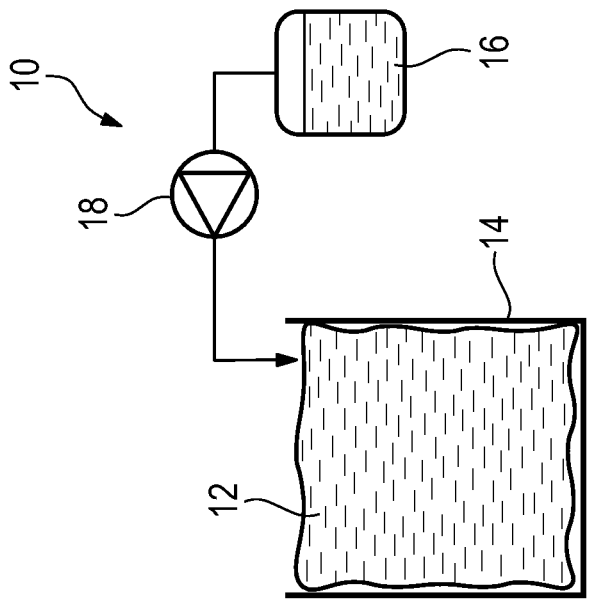
FIG. 1A shows a single-use mixing or storage system according to the prior art in normal operation.

FIG. 1A is a simplified illustration of a single-use mixing or storage system 10 as used in a biopharmaceutical process. A flexible bag 12 made of a film material is accommodated in a fixed, rigid holder made of stainless steel or hard plastic. The bag 12 may be empty or already partially filled with a fluid. In any case, no additional pressure acts on the bag 12.

The holder serves as a support structure 14 for receiving and supporting the bag 12 in several directions. In particular, the bag 12 is completely enclosed by the support structure 14 except for the top. This is a typical design allowing an operator to easily install the bag 12 inside the support structure 14 before operation and to easily remove the bag 12 from the support structure 14 after operation.

In the depicted example, a fluid is to be transferred from a reservoir 16 into the bag 12 by an electrically driven pump 18 or another filling component. The mixing or storage system 10 is not pressurized during normal operation. This means that the air contained in the bag 12 is displaced through a vent filter (not shown) when the fluid from the reservoir 16 is filled into the bag 12.

However, if the bag 12 is filled too quickly, overfilled or if the vent filter is blocked or in the event of another fault, the pressure in the bag 12 can rise in an uncontrolled manner as shown in FIG. 1B. Due to the overpressure, the bag 12 expands, especially in the upward direction where the support structure 14 does not confine the bag 12. The upward direction will thus be referred to as the main expansion direction A.

If further expansion of the bag 12 is no longer possible, especially owing to limited material strength, the bag 12 can rupture or burst. Such damage to the bag 12 must be avoided, not only for economic and process efficiency reasons (the process has to be stopped and valuable medium is lost), but above all to protect the operator, especially in case of toxic content of the bag 12.

Figure 2A:
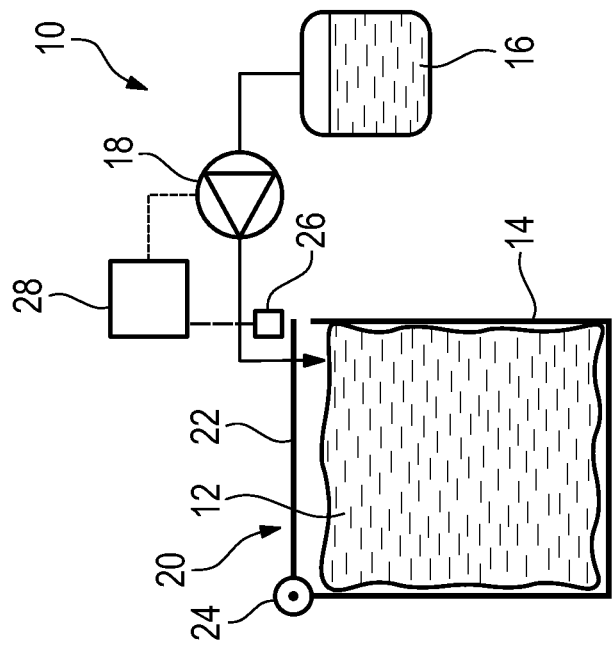
FIG. 2A shows a safety device for a single-use mixing or storage system according to the invention in normal operation.

FIG. 2A illustrates an embodiment of a safety device for a single-use mixing or storage system 10 which is similar to the single-use mixing or storage system 10 shown in FIG. 1A. The safety device comprises a detection unit 20 adapted to detect an expansion of the bag 12 in the main expansion direction A.

In the depicted example embodiment, the detection unit 20 includes a sensor element 22 that is in contact with or comes into contact with the bag 12 when the bag 12 expands. As a result, the sensor element 22 is displaced by the expansion of the bag 12 in the main expansion direction A. In particular, the sensor element 22 is a displaceable or pivotable element, such as a rod, a bar, or a lid, for example, and is hereinafter referred to as lever. The lever either rests on the bag 12 or takes a (predefined) initial position during normal operation of the mixing or storage system 10. The lever may be supported and/or guided to perform a defined displacement or pivoting movement. For example, the lever can be attached to the support structure 14 by a hinge 24 or another suitable mechanical bearing.

Figure 2B:
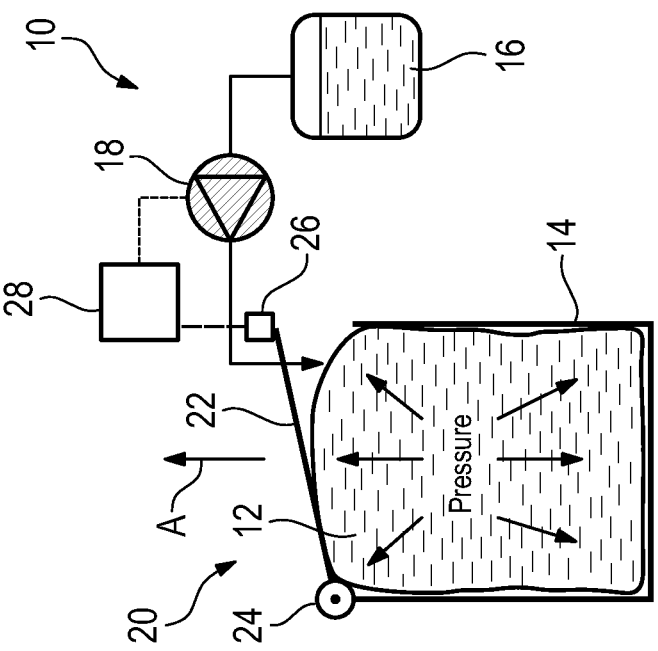
FIG. 2B shows the safety device of FIG. 2A in case of an overpressure.

The detection unit 20 further includes a trigger element 26 which is connected to a control unit 28 of the safety device. The control unit 28 is adapted to initiate a safety measure when triggered by the detection unit 20. To this end, the sensor element 22 interacts with the trigger element 26 when the expansion of the bag 12 in the main expansion direction A exceeds a given threshold. This situation is shown in FIG. 2B.

According to the example embodiment described here, the sensor element 22, i.e. the pivotable lever, is rotated by the expanding bag 12 until it physically acts on a contact switch constituting the trigger element 26. The contact switch is part of an electric circuit monitored by the control unit 28. As soon as the control unit 28 recognizes this switching operation, a safety measure is initiated to prevent the bag 12 from being damaged.

The control unit 28 may be connected to an alarm system and/or to the pump 18, so that an alarm can be triggered and/or the pump 18 can be shut down to prevent a further increase of pressure in the bag 12. Other safety measures can be initiated as well.

Instead of the contact switch, the detection unit 20 may include an angle sensor. According to this alternative, the safety measure is initiated as soon as the angle sensor detects that the pivotable lever has reached a given angular position due to a rotation of the lever caused by the expanding bag 12.

In an alternative embodiment, the trigger element 26 of the detection unit 20 does not require any physical contact with a sensor element 22 or directly with the bag 12 to emit a trigger signal to the control unit 28 in case the expansion of the bag 12 exceeds the threshold. For example, the trigger element 26 can include a photoelectric sensor. As soon as the photoelectric sensor detects an excessive expansion of the bag 12 in the main expansion direction A, the trigger signal is sent to the control unit 28, and the control unit 28 promptly initiates the safety measure.

It is to be noted that the bag 12 (possibly including pre-installed elements such as ports and directly connected hose lines etc.) is a dedicated single-use component, whereas the other components of the safety device, including the support structure 14, the sensor element 22 and the optional trigger element 26, are usually reusable, i.e. they are not configured as single-use components, although single-use configurations are not necessarily precluded.

LIST OF REFERENCE SIGNS 10 single-use mixing or storage system
12 bag
14 support structure
16 reservoir
18 pump
20 detection unit
22 sensor element
24 hinge
26 trigger element
28 control unit

What is claimed is:

1. A safety device for a single-use mixing or storage system for use in a biopharmaceutical process, the safety device comprising:
   a flexible bag made from a film material,
   a support structure configured to receive the bag and support the bag in plural directions, wherein the support structure is a container surrounding the bag on all sides except on a top side of the bag, and allows an expansion of the bag in at least one expansion direction including on the top side of the bag,
   a detection unit adapted to detect the expansion of the bag in the expansion direction, and a control unit connected to the detection unit and adapted to initiate a safety measure in response to a detection of the expansion of the bag in the expansion direction on the top side of the bag that exceeds a given threshold signifying an overfilling of the bag,
   wherein the detection unit includes a sensor element arranged to come into contact with the bag only during a latter portion of the expansion, when the bag expands so that the sensor element is translated or rotated away from the support structure by the expansion of the bag in the expansion direction on the top side of the bag, and
   wherein the sensor element includes a pivotable lever.

2. The safety device according to claim 1, wherein the detection unit further includes a trigger element emitting a trigger signal to the control unit in response to the expansion of the bag in the expansion direction exceeding the threshold.

3. The safety device according to claim 2, wherein the trigger element includes a photoelectric sensor.

4. The safety device according to claim 1, wherein the detection unit further includes a trigger element physically performing a switching operation in response to the expansion of the bag in the expansion direction exceeding the threshold.

5. The safety device according to claim 4, wherein the trigger element includes a contact switch.

6. The safety device according to claim 1, wherein the pivotable lever is mounted to the support structure by a mechanical bearing.

7. The safety device according to claim 5, wherein the trigger element includes an angle sensor.

8. The safety device according to claim 1, wherein the control unit is connected to a filling component configured to control a fluid transfer into the bag.

9. The safety device according to claim 8, wherein the filling component comprises a pump configured to control the fluid transfer into the bag.

10. The safety device according to claim 1, wherein the control unit is connected to an alarm system to initiate an audible or visual alarm as the safety measure.

11. A method for increasing safe operation of a single-use mixing or storage system as claimed in claim 1 in a biopharmaceutical process, comprising:
    providing the single-use mixing or storage system comprising the flexible bag made from the firm material;
    placing the bag into the support structure of the safety device;
    filling the bag with a liquid medium;
    detecting an overfilling expansion of the bag in the expansion direction on the top side of the bag with the detection unit,
    wherein the sensor element comes into or is in contact with the bag when the bag expands so that the sensor element is translated or rotated away from the support structure by the expansion of the bag in the expansion direction; and
    initiating the safety measure in response to the detection of the overfilling expansion of the bag in the expansion direction that exceeds the given threshold.

* * * * *